April 14, 1964 D. C. HENDERSON 3,128,921
FEED MECHANISM FOR GRANULAR MATERIALS
Filed April 13, 1961 2 Sheets-Sheet 1

INVENTOR.
DAVID C. HENDERSON
BY
Braddock and Braddock
ATTORNEYS

April 14, 1964   D. C. HENDERSON   3,128,921
FEED MECHANISM FOR GRANULAR MATERIALS
Filed April 13, 1961   2 Sheets-Sheet 2
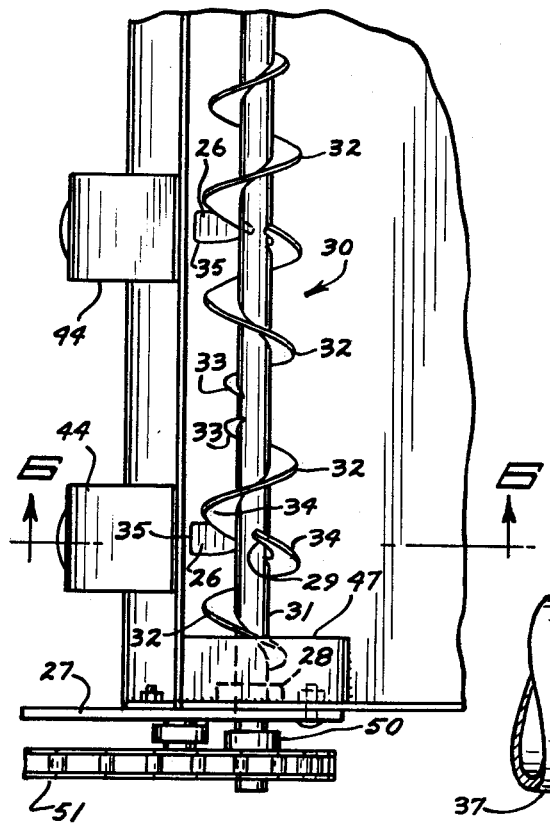
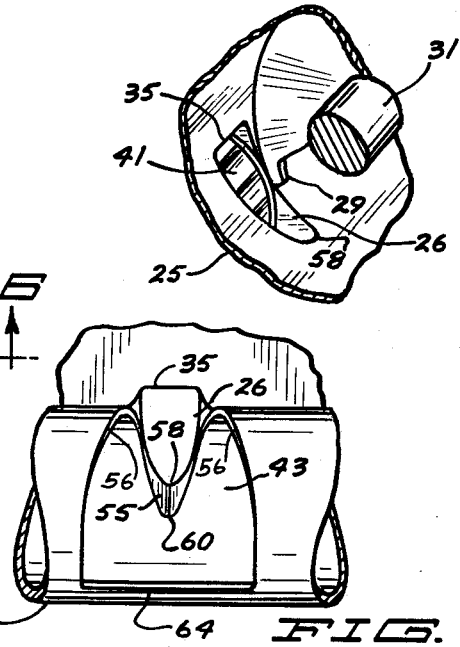
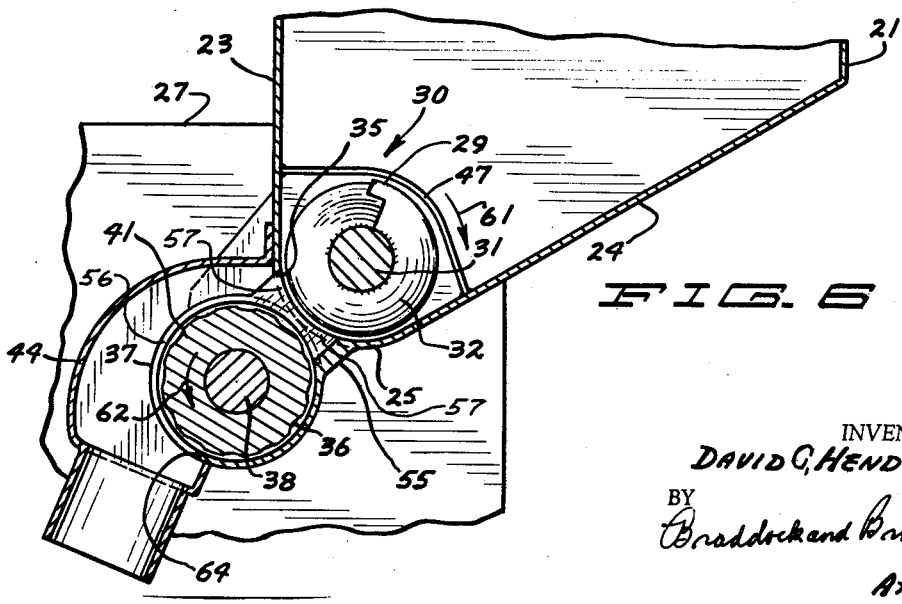
INVENTOR.
DAVID C. HENDERSON
BY
Braddock and Braddock
ATTORNEYS

United States Patent Office 3,128,921
Patented Apr. 14, 1964

3,128,921
FEED MECHANISM FOR GRANULAR MATERIALS
David C. Henderson, Tower City, N. Dak.
Filed Apr. 13, 1961, Ser. No. 102,699
16 Claims. (Cl. 222—238)

The present invention has relation to feeding mechanisms and more particularly to a mechanism that may be used for feeding granular materials from a hopper.

It has been found, particularly when using inorganic fertilizer, that present devices for distributing granular or discrete materials are not completely satisfactory. The fertilizer spreaders used with grain drills, for example, are susceptible to plugging and compaction difficulties as well as feeding the fertilizer in spurts. This intermittent fertilizer feeding results in noticeably uneven growth of field crops and prevents the most economical distribution of fertilizer. The many difficulties involved in the feeding of fertilizer are evidenced by the great variety of devices that have been presented to accomplish the job. However, none of the prior devices appear to give completely satisfactory results under field conditions.

The device made according to the present invention, as disclosed, illustrates a hopper or box for carrying a granular material, such as fertilizer, and having a rounded bottom portion provided with a plurality of outlet openings. An agitating auger, with auger sections oriented to deliver material toward the provided outlet openings in the hopper, is rotatably mounted on the hopper adjacent the bottom portion thereof. A feed roller, rotatably mounted on an axis substantially parallel to the agitating auger, is located outside of the hopper within a separate housing that is somewhat below and horizontally offset from the agitating auger. The feed roller housing has discharge openings aligning with the openings in the hopper. Material is then fed by the agitating auger and gravity through the openings in the hopper onto the feed roller. The feed roller, when it is rotating, carries the material around the outer circumference thereof and deposits it, through the force of gravity, into a suitable tube that directs the fertilizer toward the proper delivery point. The feed roll includes a plurality of relatively short roll sections, one positioned in alignment with each of the openings in the hopper. Clean out auger sections are provided between the roll sections to move material that may get into the feed roller housing out through one of the housing discharge openings.

It is an object of the present invention to present a feed mechanism that provides a uniform, metered flow of discrete material from a hopper.

In the drawings,

FIG. 3 is a fragmentary enlarged top plan view of the fertilizer spreader of FIG. 2 taken as on line 3—3 in FIG. 1;

FIG. 4 is a fragmentary perspective view of an outlet opening leading from a hopper of the fertilizer spreader to a feed roll;

FIG. 5 is a fragmentary rear elevational view of the device of FIG. 2 with a feed roll removed for clarity; and FIG. 6 is a fragmentary vertical sectional view taken as on line 6—6 in FIG. 3.

Figure 1:
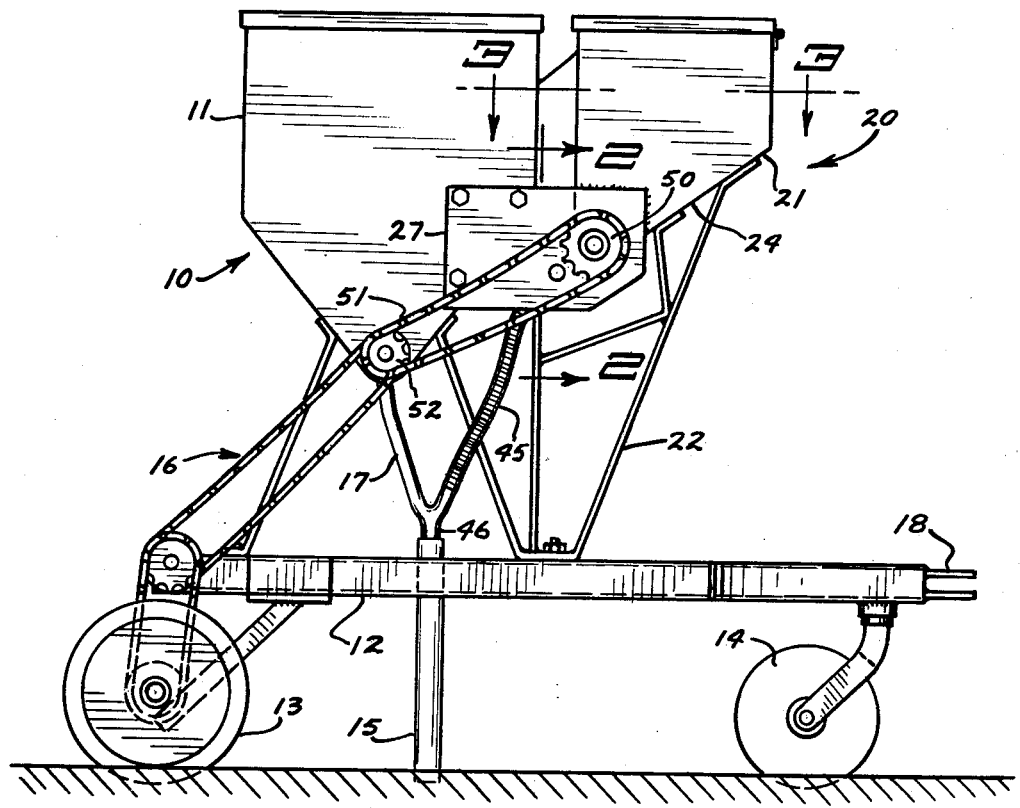
FIG. 1 is a side elevational view of a grain drill having a fertilizer attachment made according to the present invention installed thereon.
Figure 2:
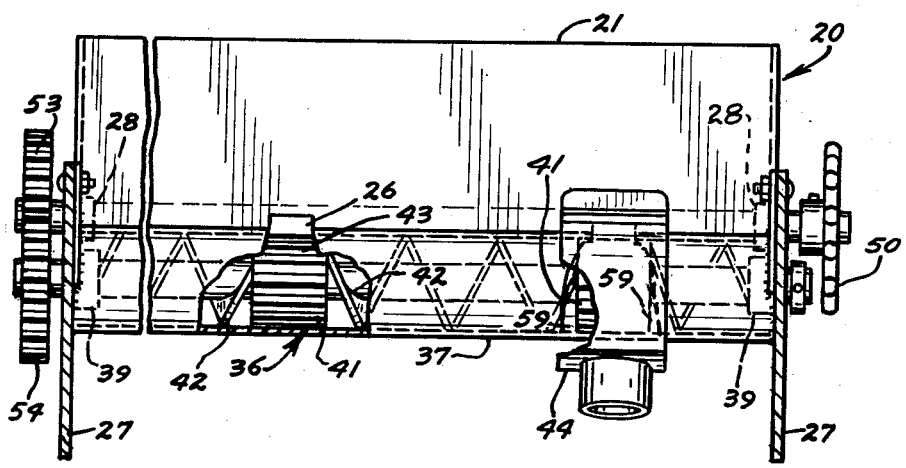
FIG. 2 is a fragmentary enlarged rear elevational view of a fertilizer attachment taken as on line 2—2 in FIG. 1, with parts in section and parts broken away.

Referring to the drawings and the numerals of reference thereon, a grain drill illustrated generally at 10 includes a grain hopper 11 that is mounted on a main frame 12. The main frame 12 is adapted to be pulled through suitable linkage 18 by a tractor (not shown). The main frame is supported by a plurality of press wheels 13 and a forward caster wheel 14. The press wheels 13 are adapted to cover the seed left in the ground by a drill seeding mechanism. The drill also has a plurality of furrow opener assemblies 15, as illustrated the "hoe" type of opener. The seeding mechanism for the drill is driven through a suitable chain and sprocket mechanism illustrated generally at 16, by the press wheels 13. A seed tube 17 extends from each of a plurality of drill seed openings (not shown) down to one of the furrow opener assemblies. The foregoing will be seen to be a typical illustration of a grain drill.

A fertilizer attachment illustrated at 20 includes a fertilizer hopper or box 21 that is mounted through suitable frame work 22 on the drill frame 12. The hopper 21 is situated forwardly from and spaced from the hopper 11 of the grain drill. The hopper 21 for the fertilizer spreader has a substantially vertical rear wall 23 and a downwardly and rearwardly sloping bottom wall 24. The rear wall and the bottom wall are joined with a curved bottom portion 25 that is cut away to provide a plurality of openings 26 therethrough. The openings 26 are positioned to substantially align with the seed openings in the grain drill hopper. A pair of end plates 27, 27 are bolted to the hopper of the grain drill and extend to engage and support the sides of the hopper of the fertilizer attachment.

An agitating auger assembly 30 is located adjacent the curved bottom portion 25 of the fertilizer hopper and consists of an auger shaft 31 with a plurality of tapered auger sections 32 fixedly mounted thereon. The auger shaft 31 is rotatably mounted on suitable bearings 28 that in turn are mounted on end plates 27, 27. The auger sections are of opposite hand or lead and they are positioned so they will move material from half way between two adjacent openings toward each of the individual openings provided in the bottom of the fertilizer hopper. The lead of the agitating auger sections is alternated along the shaft.

The agitating auger sections are tapered from an end of relatively small effective outside diameter, indicated at 33, to an end of large outside diameter, indicated at 34. The large outside diameter ends are located directly over the openings 26 in the bottom of the fertilizer hopper. The large ends of the auger sections that are positioned over the outlet openings in the fertilizer hopper overlap slightly. The outside diameters of the large ends of the auger sections are large enough so the auger will wipe material from the surfaces of curved portion 25 adjacent the edges of the openings 26 as it rotates. In particular, the area adjacent an upper bounding edge 35 of each of the openings 26 is wiped clean with every turn of the agitating auger assembly 30 in order to prevent a build up of material and a consequent depositing of a "slug" of fertilizer when the buildup becomes dislodged. Each of auger sections 32 has a tip section 29 that serves as a wiper.

A feed roller assembly 36 is mounted within a feed roller housing 37 that is attached to the fertilizer hopper. The feed roller assembly includes a shaft 38 that is rotatably mounted with respect to end plates 27, 27 on suitable bearings 39, 39. The feed roller assembly rotates about an axis parallel to the axis of rotation of said agitating auger. As shown, the feed roller is located so that a plane passing through the centers of rotation of the auger shaft 31 and the feed roller shaft 38 is positioned at approximately 45 degrees with respect to a horizontal line. A plurality of feed roller sections 41 are drivably mounted on the feed roller shaft 38 and one of said sections is aligned with each of the openings 26 in the fertilizer hopper. The feed rollers sections may be made slightly corrugated as shown or may be smooth. Any desired or preferred material may be used, for example, steel, rubber or plastic. A plurality of clean out auger sections 42 are fastened to the feed roller shaft in between the feed roller sections.

The feed roller housing 37 has a plurality of openings 43 each of which is open to one of the openings 26 in the bottom of the fertilizer hopper. The openings 43, as well as the openings 26 are constructed to present no restriction to material flow and the exact construction of these openings will be described later. A boot 44 or other type of cover is positioned over each of the openings 43 in the feed roller housing 37. A flexible tube 45 is connected to the boot 44 and extends down to join the seed tube 17 with a suitable Y connector 46.

A pair of shields 47 are positioned within the fertilizer hopper over the ends of the shaft 31 for the agitating auger and each serves to shield one of the auger bearings 28 from fertilizer material. It will be noted that the agitating auger sections 32 that are next adjacent the end walls of the fertilizer hopper will move any fertilizer material that is underneath the shields away from the bearings.

A sprocket 50 is drivably mounted on one end of the auger shaft 31 and a chain 51 drivably connects it to a suitable sprocket 52 that in turn is drivably mounted on the shaft for the seeding mechanism of the grain drill. In this way, the agitating auger is driven whenever the grain seeding mechanism is in operation.

A first spur gear 53 is drivably mounted on the auger shaft 31 at an end thereof opposite from sprocket 50 and this gear in turn drivably engages a second spur gear 54 that is drivably mounted onto the corresponding end of feed roll shaft 38, thus whenever the agitating auger is turning the feed roller will also be rotating in an opposite direction.

A transition throat piece 55 is positioned at each outlet opening between the fertilizer hopper 11 and the feed roller housing 37 where the outer surfaces of the hopper and the feed roll housing do not touch. This transition piece is to provide for a smooth throat for movement of the fertilizer material from the hopper to the feed roller and directs the fertilizer material toward a predetermined area of the feed roller.

Each of the openings 26 in the fertilizer hopper and also the openings 43 in the feed roller housing are constructed in a novel manner. The openings 26 are bounded by side edge surfaces 57, 57 joining inner and outer surfaces of the curved bottom portion 25 of the hopper. The side edge surfaces are joined on an apex 58 that is located substantially below the agitating auger and diverge outwardly and upwardly around the curved bottom portion 25. The upper bounding edge surface 35 of opening 26 joins the side edge surfaces 57, 57 and defines the upper limit of each of the openings. The upper bounding edge 35 is positioned substantially parallel to the axis of rotation of the agitating auger.

The upper edge 35 of each of the openings 26 in the hopper is also positioned so that a plane tangent to the outer surface of the feed roller sections and intersecting the respective edges 35 will be positioned at an angle less than the angle of repose of the material contained in the hopper with respect to a horizontal plane. This will prevent the material from flowing freely out under the edge 35 and over the feed roller sections.

Each of the openings 43 in the feed roller housing is bounded by a pair of side edges 56, 56 joining the inner and outer surfaces of the feed roller housing. These side edges are joined at an apex 60 that is, as shown, located on a line running approximately 45 degrees downwardly from the apex 58 of the aligning opening 26. The side edges 56, 56 progress divergingly initially upwardly and outwardly around the outer wall of the feed roll housing for a substantial portion of the circumference thereof. A lower bounding edge surface 64 joins the side edge surfaces 56, 56. The lower edge surface is situated substantially parallel to the axis of rotation of the feed roller.

The location of the feed roller with respect to the upper edge 35 of the openings 26 is such that material flowing freely out under the upper edge 35 and resting at its angle of repose will intersect the roller in a substantially horizontal line that will be disposed below the uppermost part of the feed roller. However, in order to insure that the material will be carried upwardly over the feed roller, this line of intersection must be sufficiently above the axis of rotation of the feed roller so that a plane projected tangent to the feed roller and passing through the line of insection of the roller and the material that flows freely onto the roller is situated at an angle less than the angle of repose of the material, with respect to a horizontal line.

It should also be noted that the openings 43 in the feed roller housing diverge constantly, as stated before, from their apexes 60 and are wider than the feed roller sections at their lower edge 64. This clearance between the edges of the openings 43 and the roller sections provides a port 59 on either side of each of the feed roller sections so that the cleanout auger sections 42 may move material in the housing toward the roller sections and discharge it out the ports 59 and then through the provided tubes 45. The cleanout augers extend past the edges of the ports 59 so the areas adjacent the edges are being constantly wiped by the auger flights to prevent fertilizer buildup.

The transition piece 55 of each of the openings joins the edges 56 of each of the openings 43 with the edges 57 of the corresponding opening 26 and is provided to assure a smooth structure to carry the fertilizer from the hopper to the feed roller.

*Operation*

When the fertilizer spreader is to be used, the hopper is filled with a suitable fertilizer material and the unit is taken out into the field. Whenever the drill feeding mechanism is operating, the chain 51 will drive sprocket 50 and the fertilizer attachment will also be operating. As the agitating auger rotates under the driving force from sprocket 50, in direction as indicated by arrow 61, the gears 53 and 54 will mesh so that the feed roller assembly 36 is also turning.

As the agitating auger turns, the tapered auger sections 32 will move material from halfway between adjacent openings 26 toward each of these openings. The tapered sections provide for an even movement of fertilizer material and give a very smooth feed. It will be noted that the tapered sections overlap over the openings 26 and adjacent auger sections are positioned with their end edges approximately 180 degrees apart to give smooth feeding characteristics.

Without the tapered sections the auger would give a "boiling" action. In other words, the material would be pulled from the area between adjacent openings in such quantity that there would be a buildup above the openings 26. The material would be forced upwardly there. The material above the area between openings would drop and thus a circulating or boiling action would be started. The fertilizer would circulate up in the area over the outlet openings and down in the area midway between openings. This would result in pulverization of the granular material and result in fines that are undesirable in the feeding of fertilizer. By regulating the speed ratio between the agitating auger and the feed roller the degree of agitation can be controlled to give sufficient action to break up any lumps. The larger lumps are easily fed under the auger at the narrow end thereof and are broken up as they move toward the openings and the larger end of the auger.

As the agitating auger rotates, the material over each of the openings 26 in the bottom of the fertilizer hopper will move downwardly onto one of the feed roller sections which is moving in direction as indicated by arrow 62 in FIG. 6. This feed roller section will then lift the fertilizer and carry it over the top thereof. After the fertilizer moves over the top of the roller it will drop off from the roller under the force of gravity and pass through the opening 43 into the tube 45 leading to the furrow opener. The entire throat between the hopper and feed roller will be filled with material and the roller will feed it at a predetermined rate. The roller does not cut or pocket the material as in previous devices but merely lifts it up and over the circumference thereof. The relationship between the throat piece 55 and the feed roller is such that the material will be carried around the roller instead of falling off in the wrong direction or building up. This relationship depends on the type of material the roller is made from, the type of outer surface of the roller, the diameter of the roller and the angle of repose of the material.

The wiping edges or lips 29 of the agitating auger sections are positioned to come very close to the inner surfaces of the hopper adjacent the edges of the openings 26 and remove any fertilizer that may tend to build up adjacent these openings. This is especially important adjacent the upper edge 35 of each of the openings. If the auger does not completely remove the material adjacent this upper edge it may build up and eventually drop down onto the feed roller in a slug, which will cause uneven feeding of the fertilizer into the feed tubes.

Any fertilizer material that may work its way into the feed roller housing between the feed roller sections will be moved by the cleanout auger sections to position to drop out through the provided ports 59. This will prevent any lodging or packing of fertilizer between the openings in the feed roller housing 37.

The agitating auger sections feed the fertilizer gently onto the feed roller and the direction of rotation of the agitating auger shaft 31 is such that the auger sections tend to push the fertilizer material onto the feed roller section, rather than compact it against the bottom of the hopper. After the fertilizer is once fed onto the feed roller it is unrestricted in its discharge path as the openings 43 in the feed roller housing are constantly diverging to prevent any compaction. The lower edge 64 of each of the openings 43 is sufficiently close to the feed roller sections so that if any material tends to adhere to the roller section it will be scraped off before the buildup is enough to be harmful.

The relative locations of the agitating auger and the feed roller, together with the diverging openings and the tapered auger sections on the agitating auger all cooperate to give a very even, smooth feed of fertilizer. This results in an even growth of the seeded crop and maximum utilization of the fertilizer material to increase the yield of planted crops.

What is claimed is:

1. A feed mechanism for controlling the flow of material from a hopper having a curved bottom portion provided with a plurality of openings therethrough, said feed mechanism including an agitating auger rotatably mounted concentric with said curved bottom portion, a tubular housing fixedly attached with respect to said curved bottom portion and disposed below and horizontally offset from said outlet openings of said hopper, said tubular housing being provided with a plurality of openings therethrough substantially in alignment with said openings in said hopper, a feed roller assembly rotatably mounted within and concentric with said housing on an axis substantially parallel to the axis of rotation of said agitating auger, said openings in said tubular housing being defined by a pair of side bounding edges that are joined at an apex which is in alignment with and below said openings in said hopper and which diverge in the direction of rotation of the feed roller circumferentially around a major portion of said tubular housing and a bottom bounding edge joining said side edges situated below and substantially parallel to the axis of rotation of said feed roller assembly, a separate transition piece integral with and extending between each of the openings in said hopper and the corresponding opening in said feed roller housing and positioned to direct material from said hopper to a predetermined area of said feed roller, and means to rotate said agitating auger and said feed roller in opposite directions, said feed roller being adapted to carry said material from said predetermined area upwardly in a circumferential path over said feed roller to a position wherein said material will discharge through said openings in said tubular housing under the force of gravity.

2. The combination as specified in claim 1 wherein said feed roller assembly includes a plurality of feed roller sections each positioned in alignment with one of said openings in said hopper and wherein said feed roller sections are shorter than the bottom bounding edge of their respective corresponding openings in said tubular housing.

3. The combination as specified in claim 2 wherein said feed roller assembly includes a plurality of cleanout auger sections fixedly attached between adjacent feed roller sections and each positioned to move material within said tubular housing toward one of said openings in said housing.

4. The combination as specified in claim 3 wherein the cleanout auger sections each extend beyond the edge of the opening in said housing with which they are associated and are of sufficient diameter to wipe material from surfaces of the housing adjacent said housing opening.

5. A feed mechanism for controlling the flow of material from a hopper having a curved bottom portion provided with a plurality of openings therethrough, said feed mechanism including an agitating auger rotatably mounted concentric with said curved bottom portion, said agitating auger including an auger shaft having a plurality of fixedly attached auger sections, said auger sections each being tapered and each having a small end thereof situated substantially halfway between adjacent openings through said hopper and a large end thereof positioned over one of said openings and positioned to move material toward its associated opening, said openings through said hopper being defined by a pair of side bounding edges joined together at an apex below the axis of rotation of said agitating auger and extending divergingly upwardly along said curved bottom portion and an upper bounding edge joining said side edges and situated substantially parallel to the axis of rotation of said auger, a tubular housing fixedly attached with respect to said curved bottom portion of said hopper and disposed downwardly from said openings through said hopper, said tubular housing being provided with a plurality of openings therethrough substantially in alignment with said openings through said hopper, said openings in said tubular housing being defined by a pair of side bounding edges joined together at an apex in alignment with and disposed downwardly from said apex of said openings through said hopper and extending divergingly upwardly and circumferentially around said tubular housing and a bottom bounding edge joining said side edges and situated substantially parallel to the axis of rotation of said agitating auger, a feed roller assembly rotatably mounted in said housing on an axis substantially parallel to the axis of rotation of said agitating auger, said feed roller assembly including a plurality of feed roller sections each positioned in alignment with one of said openings through said hopper, said feed roller sections being shorter than the length of said bottom bounding edges of corresponding openings in said tubular housing, a transition piece joining the side edges of each of the openings through said hopper and the corresponding side edges of one of the openings in said tubular housing and each being positioned to direct material from said hopper to a predetermined area of one of said feed roller sections, and means to rotate said agitating auger and said feed roller assembly in opposite directions, said feed roller sections being adapted to carry said material from said first predetermined area in a circumferential path over said feed roller sections to a position wherein said material will discharge through said openings in said tubular housing under the force of gravity.

6. The combination as specified in claim 5 wherein said feed roller assembly includes a plurality of cleanout auger sections positioned between said feed roller sections and each adapted to move material within said tubular housing toward one of said openings in said housing.

7. The combination as specified in claim 6 wherein said agitating auger sections overlap over the openings through the hopper and are of sufficient diameter to prevent material from accumulating adjacent the edges of said openings, and said cleanout auger sections extend beyond the edges of said openings in said housing and are of sufficient diameter to prevent material from accumulating adjacent the edges of said housing openings.

8. The combination as specified in claim 6 wherein a plane tangent to each of said feed roller sections along a line above the axis of rotation thereof and intersecting the upper edge of the corresponding hopper opening is situated at an angle less than the angle of repose of said material in said hopper with respect to a horizontal plane.

9. The combination as specified in claim 8 wherein a plane tangent to outer surfaces of said feed roller sections and passing through the line of intersection of the surfaces of said roller sections and a plane extending from the upper bounding edge of said hopper openings toward said feed roller along the angle of repose of material flowing under said upper bounding edge from said hopper is situated at an angle less than said angle of repose with respect to a horizontal plane.

10. The combination as specified in claim 9 wherein a line defined by each of the apexes of the openings in said hopper and the apex of each aligning opening in said tubular housing is substantially 45 degrees with respect to a horizontal line.

11. A mechanism for metering the flow of material from a storage hopper provided with at least one discharge opening therethrough, said mechanism including an agitator mounted with respect to said hopper in adjacent relationship with said opening, a feed roller rotatably mounted with respect to said hopper positioned in alinement with and below said discharge opening, a transition piece positioned to direct material passing through said opening in said hopper toward a predetermined area of an outer surface of said feed roller, the bounding edges of said transition piece adjacent said feed roller being joined at an apex which is in alinement with and below said opening in said hopper and said bounding edges of said transition piece diverging from said apex in direction of rotation of said feed roller, and means for rotating said feed roller in direction to carry said material circumferentially over said roller.

12. A feed mechanism for controlling the discharge from a hopper adapted to carry a discrete material and having a curved bottom portion provided with a plurality of openings therethrough, said feed mechanism including an agitating auger rotatably mounted concentric with said curved bottom portion, said auger having a plurality of fixedly attached tapered auger sections each designed to carry material from halfway between adjacent openings in said hopper toward one of said openings, said tapered auger section having a relatively small outside diameter substantially halfway between adjacent openings in said hopper and tapering to a relatively large outside diameter over one of the openings in said hopper, adjacent sections of said auger overlapping over their associated opening and being of sufficient diameter to wipe material away from the curved bottom portion adjacent the edges of said opening, means for rotating said agitating auger in a first direction, a feed roller rotatably mounted on an axis substantially parallel to the axis of rotation of said agitating auger, a separate transition piece fixedly attached with respect to each of said openings and positioned to direct material passing through said opening onto a predetermined area of an outer peripheral surface of said feed roller, and means to rotate said feed roller in a second direction to carry said material directed onto said roller circumferentially over it to position wherein material will fall from said roller under force of gravity.

13. The combination as specified in claim 12 wherein each of said openings through said curved portion of said hopper is defined by a pair of side bounding edges that are joined at an apex substantially below the center of rotation of said agitating auger and progress divergingly outwardly and upwardly along said curved portion and an upper bounding edge joining said side edges and running substantially parallel to the axis of rotation of said agitating auger.

14. The combination as specified in claim 13 wherein a plane tangent to said feed roller along a line above the axis of rotation thereof and intersecting said upper edges of said openings through said curved bottom portion is situated at an angle less than the angle of repose of said material with respect to a horizontal line.

15. A mechanism for metering the flow of inorganic fertilizer material from a mobile fertilizer storage hopper provided with a plurality of discharge openings therethrough, said mechanism including an agitator mounted with respect to said fertilizer hopper in adjacent relationship with said opening, a fertilizer feed roller rotatably mounted with respect to said hopper and positioned in alignment with and below said discharge opening, transition means terminating closely adjacent the feed roller for directing fertilizer material passing through said opening onto said feed roller and restraining the side boundary edges of the fertilizer material in contact with the roller in a pattern that constantly diverges in the sense of rotation of the roller from location where the material first contacts the roller to the location where the material falls from the roller, and means to rotate said roller in direction to carry said fertilizer material circumferentially over said roller as said mobile fertilizer storage hopper is moved along the ground surface.

16. A mechanism for metering flow of material from a storage hopper provided with at least one discharge opening therethrough, said mechanism including an agitator mounted with respect to said hopper and in adjacent relationship with said opening, a feed roller rotatably mounted with respect to said hopper positioned in alignment with and below said discharge opening, transition means terminating closely adjacent the feed roller for directing material passing through said opening onto said feed roller and comprising at least two bounding walls forming a narrowing portion for the material supported on said roller so that the material in contact with said roller forms a pattern on the surface of the roller which diverges in the sense of rotation of the roller, so that a predetermined axially extending line on the surface of the roller will first pass beneath the narrowest portion of the transition means during each revolution of the roller.

References Cited in the file of this patent

UNITED STATES PATENTS

| 77,269 | Foster | Apr. 28, 1868 |
| 823,598 | Higgs et al. | June 19, 1906 |
| 1,489,739 | Chisholm | Apr. 8, 1924 |
| 2,279,613 | Blue | Apr. 14, 1942 |
| 2,657,831 | Pierce | Nov. 3, 1953 |
| 2,748,989 | Russel | June 5, 1956 |
| 3,001,633 | Heitshu | Sept. 26, 1961 |

FOREIGN PATENTS

| 473,815 | France | Oct. 15, 1914 |